Sept. 18, 1934.   E. KUYK   1,974,114

ACTUATING MECHANISM FOR BASCULE BRIDGES

Filed Dec. 30, 1932

Inventor:
Egbert Kuyk,
By E. F. Hendworth
Atty

Patented Sept. 18, 1934

1,974,114

UNITED STATES PATENT OFFICE 1,974,114

ACTUATING MECHANISM FOR BASCULE BRIDGES

Egbert Kuyk, Amsterdam, Netherlands, assignor to Werkspoor N. V., Amsterdam, Netherlands, a company of the Netherlands Application December 30, 1932, Serial No. 649,660 In the Netherlands January 25, 1932

6 Claims. (Cl. 14—38)

It has been heretofore proposed to provide bascule bridges having a fixed axis of rotation with an actuating mechanism comprising a stationary segment with a common or lantern gearing disposed in the back lever chamber and cooperating with a pinion mounted on the back arm of the bascule for the purpose of opening the bridge. It has also been proposed to drive the pivot of the bridge direct by means of a gear keyed thereon.

In the known actuating mechanisms for bascule bridges the transmission ratio of the drive transmitting means inserted between the bridge and the electromotor is not variable, so that the final speed corresponds to the normal speed. With a view to this circumstance it is necessary to stop the bascule by means of a pre-terminal switch before it reaches its end position, whereupon the end position is reached at a reduced speed by means of a separate switching arrangement. In addition the bridge must be locked or fixed in its closed position, which necessitates a separate mechanism.

The moment of resistance of the bridge varies in consequence of the wind pressure, so that the moment to be supplied by the motor shaft increases until it reaches its highest value in the open position.

The construction according to the invention is distinguished from the known arrangements, inasmuch as the transmission ratio between the motor shaft rotating with constant speed and the bridge pivot is made variable and the speed of the bridge is caused to approach zero near the end positions, while during the greater part of the travel of the bridge through its course the speed is reduced in accordance with the increase of the wind pressure exerted upon the bridge.

Accordingly, the moment to be supplied by the motor approaches zero near the end positions, whereas when the wind pressure increases it remains approximately constant. A relatively small motor output will therefore suffice and a separate locking or fixing mechanism may be dispensed with. In addition, a pre-terminal switching arrangement and a final adjustment device becomes superfluous and the kinetic energy of the movable span does not require braking.

If the invention is applied to a drawbridge, the same advantages are secured.

In the accompanying drawing several forms of construction of the invention are shown by way of example.

Figure 1:
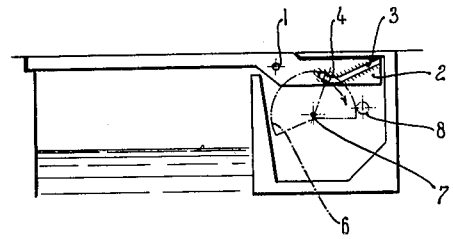
Figs. 1 and 2 show a bascule bridge in closed and open position respectively.
Figure 2:
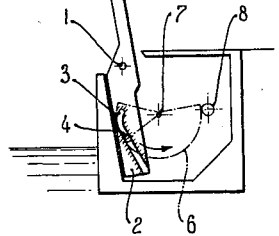
Figure 3:
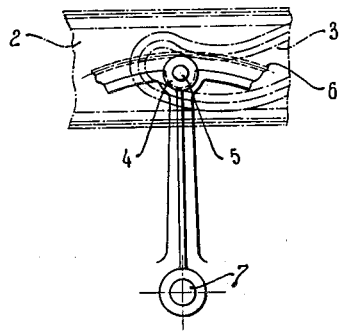
Fig. 3 and 4 show details of the actuating mechanism in side elevation and sectional view respectively.
Figure 4:
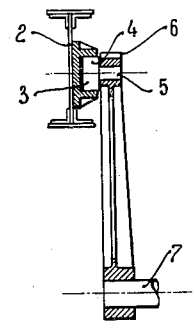

The bridge shown in Figs. 1 and 2 is rotatable round the pivot 1. The back arm 2 has a slideway 3 for the roller 4 rotatably mounted on a pin 5 (see also Figs. 3 and 4) of a toothed segment 6. The latter is pivotally mounted on the shaft 7 and is driven by the pinion 8. When the toothed segment rotates through approximately 200°, the bridge moves from one position into the other.

As will be seen in Figs. 1 and 2, the guiding roller 4 in its two end positions is located in such parts of the slideway 3 that are approximately tangential to the circle arc described by the roller 4 round the shaft 7. The form and the position of the slideway are therefore such that the bridge near its end positions has an angular speed which approaches zero and that it is automatically locked in these positions. Furthermore, the slideway is so formed that as the angle of the opening and therewith the wind pressure exerted upon the bridge increases, the angular speed decreases, therefore the pinion 8 is uniformly loaded along the greater part of its travel, the load being reduced to zero near the end positions.

In the position shown in Fig. 1 the guiding roller may be utilized, at the same time, for slightly lifting the back arm, so that a separate fixing mechanism may be dispensed with.

Obviously, the bridge will be usually provided with a slideway on both sides.

Figure 5:
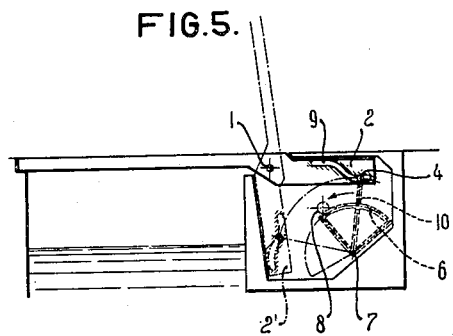
Fig. 5 shows an alternative form of the actuating mechanism for a bascule bridge.

In the construction shown in Fig. 5 the slideway 9 has a slightly different form. The roller 4 is mounted on an arm 10, which latter is rigidly secured to the toothed segment 6, whereby the roller 4, upon rotation of the segment during opening of the bridge, moves in a direction opposite to that shown in Figs. 1 and 2. Consideration of Fig. 5, especially the dotted line position of the bridge will show the manner in which the segment 6, arm 10, roller 4, and slot 9 cooperate to bring about the opening of the bridge.

Figure 6:
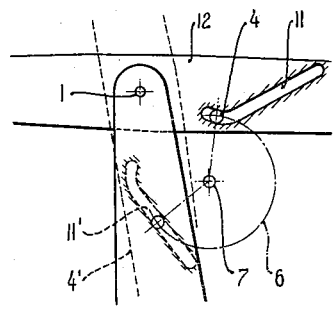
Fig. 6 is a side elevation of a detail of a drawbridge having an actuating mechanism according to the invention.

In case of drawbridges as in Fig. 6, the slideway 11 is disposed on the beam 12.

What I claim is:—

1. A bridge having a double-armed span swingable about a fixed horizontal axis intermediate its length, comprising means adjacent one end of said span defining a smooth-faced slot, rotatable means mounted on a fixed part of the structure, and having a roller therein for power-transmitting engagement with said slot, and a substantially constant speed power source for driving said means, said slot having portions in the regions which cooperate with the roller when the span approaches its end positions which are substantially tangential to the circular arc described by said roller during its rotation, to decrease the angular speed of the span and to lock the same in position.

2. A double-armed bridge swingable about a fixed horizontal axis intermediate its length, comprising a plate disposed beyond at least one end of said bridge, means adjacent one end of said bridge defining a smooth-faced slot, a segmental rack, a roller fixed on said rack and revolvable therewith, and engaging with said slot, and a substantially constant-speed means for driving said rack, and transmitting power from said means through said slot, said slot having portions which are substantially tangential with the rack in the regions which cooperate with the roller when the span approaches its end position to decrease the angular speed of the span, and having an end portion so shaped that the roller forces the cooperating arm upwardly against said plate into locking position, as the bridge approaches its closed position.

3. A double-armed bridge having a span swingable about a fixed horizontal axis intermediate its length, comprising a plate above one end of said bridge, means adjacent one end of said span defining a slot, rotatable means having a roller fixed thereon and revolvable therewith, for power-transmitting engagement with said slot, and a substantially constant speed power source for driving said last-mentioned means, said slot having portions in the regions which cooperate with the roller when the span approaches its end position which are substantially tangential to the circular arc described by said roller during its rotation, to decrease the angular speed of the span and having an end portion so shaped that the roller forces the cooperating arm upwardly against said plate into locking position as the bridge approaches its closed position, said slot also having a radially diminishing curvature in its central active portion, in proportion to the increased wind load as the span swings open, to decrease the angular speed in proportion to the degree of opening.

4. A double-armed bascule bridge having a fixed axis of rotation intermediate its length, the back arm of the bridge having a smooth-faced slot, a segmental member rotatable about a fixed axis, a roller fixed on said member and engaging with and transmitting power through said slot, said slot having portions at each end which are substantially tangential to the circular arc described by said roller during its rotation, and having a gradually increasing radius of curvature in order, with substantially constant driving speed, to decrease the angular speed of the bridge in proportion to the degree of opening.

5. A double-armed bascule bridge having a fixed axis of rotation intermediate its length, the back arm of the bridge having a smooth-faced slot, a segmental member rotatable about a fixed axis, a roller fixed on said member and engaging with and transmitting power to said slot, said slot having portions at each end which are substantially tangential to the circular arc described by said roller during its rotation, and having a gradually increasing radius of curvature in order, with substantially constant driving speed, to decrease the angular speed of the bridge in proportion to its degree of opening, and a cover over the rear arm of the bridge, the slot being shaped at at least one end to tend to force the roller inwardly, in the direction of its axis, so that the roller, when in its extreme position, in that end of the slot which causes the bridge to be in its horizontal position, slightly raises said rear arm to force it into contact with said cover.

6. In a brake-free, motor-driven bascule bridge, means actuated by the drive mechanism for causing the speed of the bridge to approach zero near each end position of the span of the bridge and for causing the speed to reduce as the bridge sweeps upwardly through its vertical angle, thereby causing the moment on the drive means to be substantially constant during the major portion of the sweep of the bridge, the said means comprising a segmental rack, a motor-driven pinion for rocking said rack, a crank pin on said rack, and a two-armed bridge pivotal on a fixed axis, the back arm of said bridge having a smooth-faced slot therein in which said crank pin engages, in power transmitting relation, the said slot being so curved that near the terminal positions of the bridge, the portion of the slot in which at that time the pin moves is approximately tangential to the circular arc described by the pin during its rocking, and so that its radius of curvature increases from its portion corresponding to the closed position of the bridge to its portion corresponding to the open position, the bridge through the major part of its sweep thereby loading said pin substantially uniformly.

EGBERT KUYK.